Oct. 27, 1942.    W. F. FELL    2,299,887
CONTROLLING SYSTEM
Filed May 21, 1941
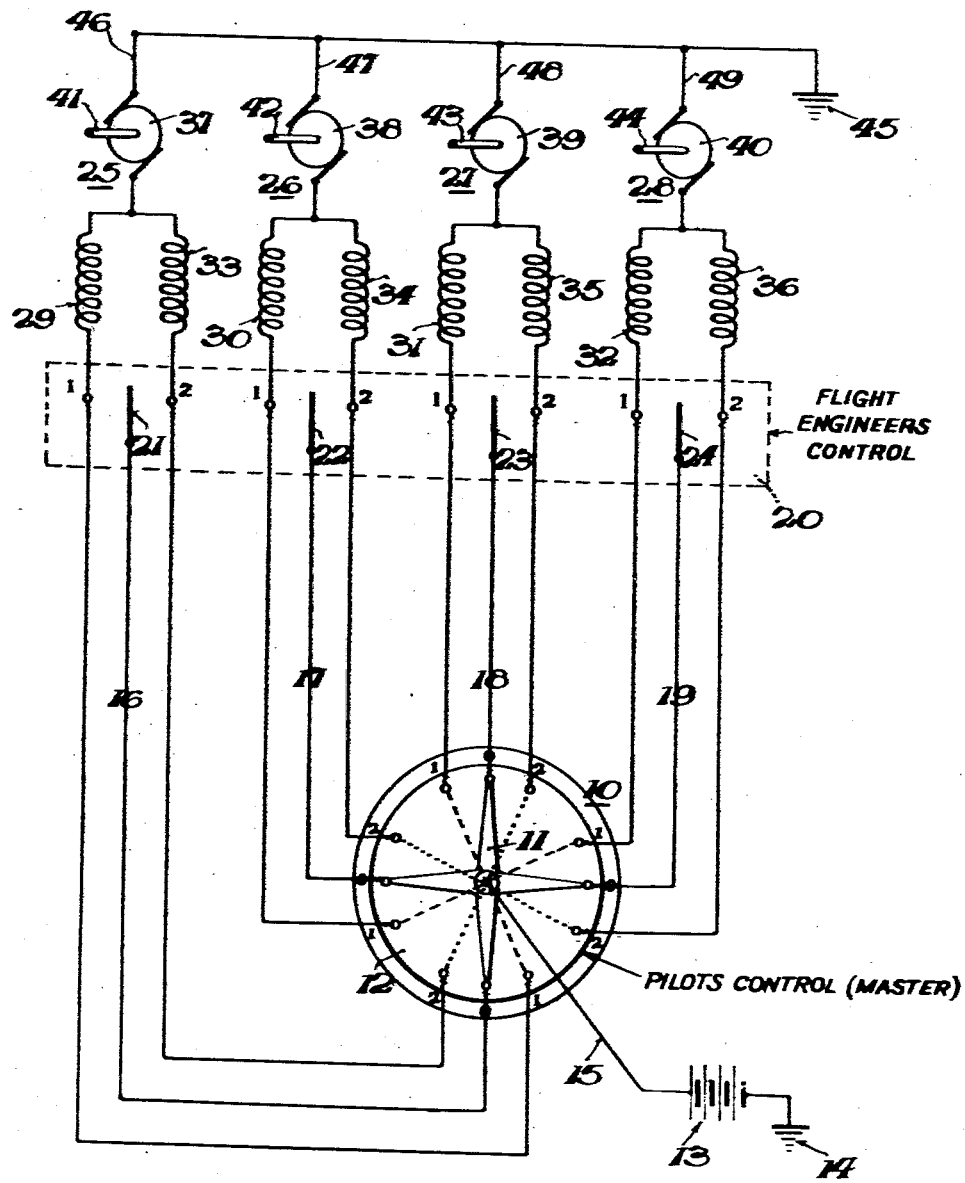
INVENTOR
William F. Fell
BY David F. Doody
ATTORNEY Patented Oct. 27, 1942

2,299,887

UNITED STATES PATENT OFFICE 2,299,887

CONTROLLING SYSTEM

William F. Fell, Trenton, N. J., assignor to Bendix Aviation Corporation, South Bend, Ind., a corporation of Delaware Application May 21, 1941, Serial No. 394,555

1 Claim. (Cl. 172—239)

This invention relates to speed controlling systems, and more particularly to a means for controlling the speed of aircraft engines.

It is an object of the present invention to provide a system for multi-engined aircraft, whereby the speed of any one or more engines may be separately controlled, but wherein all engines are subject to simultaneous and uniform control.

It is another object of the invention to provide a system whereby the individual control of the propeller or throttle of any engine of a multi-engined aircraft may be effected under certain conditions, but under other conditions, all engines may be subject to simultaneous control.

Other objects will appear from a study of the following specification when made in conjunction with the attached drawing.

The single figure of the drawing is a schematic diagram of an electrical circuit representing an embodiment of the present invention.

The system represented in the drawing will accommodate the simultaneous or individual adjustment of the propeller or throttle of each engine of a four-engine craft. A central master control station 10, has a four-armed switch member 11, centrally pivoted adjacent a circular terminal board 12, having four sets of contacts, each set of which has contacts marked 1, 0 and 2. A battery 13, having one side grounded at 14, is connected by means of a conductor 15, to the central portion of switch member 11. Four sets of conductors 16, 17, 18 and 19, each set having three conductors, extend between the master pilot's station 10, and a secondary control station 20. This station has four switch members, 21, 22, 23 and 24, each capable of deflection from the open circuit condition, as shown, to one or the other of the contacts marked 1 and 2. These contacts in each set are connected to the terminals marked 1 and 2, respectively, of each set of terminals at the master station 10. Each of the series wound motors 25, 26, 27 and 28, has one of the field members 29, 30, 31 and 32, connected to terminals 1 and switch assemblies 21, 22, 23 and 24, and oppositely wound fields 33, 34, 35 and 36, connected to their respective terminals 2. The motors have armature members, 37, 38, 39 and 40, carrying, respectively, shafts 41, 42, 43 and 44. Each has one side of its armature connected to ground at 45 through conductors 46, 47, 48 and 49. These motors may be pitch adjusting motors of the type designated at 9 in the patent of Turnbull, 1,793,653, (Variable pitch propeller), or they may be connected to the throttle valve of each of the four engines of the aircraft.

With switch 11 having its four arms on the 0 contacts of the terminal board 12, the knife switches, 21, 22, 23 and 24 are at battery potential, and as the armatures 37, 38, 39 and 40 of these motors are in circuit with battery 13 by way of the ground connection 45, upon movement of any or all of switch members 21, 22, 23 or 24 to either of the terminals 1 or 2 at the secondary station 20, the motors 25, 26, 27 and 28, or any of them, may be energized and cause the propeller or the throttle setting of the engines to be varied. If we assume that shafts 41, 42, 43, 44 will be rotated clockwise upon the closing of switches 21, 22, 23, 24, respectively, upon their individual terminals 1, then rotation of shafts 41, 42, 43, 44, will be counterclockwise upon the closing of the switches 21, 22, 23, 24 upon their respective terminals 2, as the oppositely wound fields 29, 30, 31, 32, and 33, 34, 35, 36, will cause armatures 37, 38, 39, 40 to rotate in opposite directions.

It has been proved to be quite necessary in the operation of large flying boats to be able to make individual adjustment to each engine propeller in flight, and this control is effected by the flight engineer at station 20. While it is important that the propellers be individually adjusted at certain intervals in flight, there are other times, particularly during takeoff and landing, at which all engine and propeller adjustments can be made with safety only under control of the pilot or captain.

When the arms of switch 11 are moved to the position indicated by the dotted lines, all the propellers will be turned in one direction, for example, in a direction to increase the pitch, until the desired pitch indication or engine speed has been obtained, after which, the pilot may return switch 11 to the position shown. With the switch arms of switch 11 all on the contacts marked 2, battery potential is removed from the switch blades 21, 22, 23 and 24, so that the flight engineer cannot possibly make an individual adjustment to the propeller of any of the engines. Likewise, when switch 11 has its arms in the position indicated by the dash lines, all the propeller motors are simultaneously operated to vary the propeller pitch in the opposite direction, for example, to decrease the pitch. With arms of switch 11 in this position, switch blades 21, 22, 23 and 24 are disconnected from the battery 13, and the flight engineer cannot possibly make an adjustment of the pitch of any propeller while the pilot is adjusting all propellers simultaneously. When the arms of switch 11 are returned to the position shown in the drawing, on the 0 contact, the propellers will maintain the adjustment given them by the pilot until such time as the flight engineer decides to individually adjust any of the propellers of the aircraft.

Thus, it will be appreciated that the pilot or flight captain may exert full control over the throttle or pitch varying units without having to signal to any other station for such control, and yet, when the flight engineer wishes to make routine propeller or throttle adjustments, he knows that these adjustments cannot be made contrary to the wishes of the flight captain, as the latter may leave the switch 11 in the position shown, giving the engineer control at station 20.

While only one embodiment of the present invention has been shown in the drawing, it is to be understood that various changes may be made without departing from the scope of the present invention. For this reason, it is intended not to limit the invention by the description herein given as an example, but solely by the scope of the appended claim.

What is claimed is:

An engine speed adjusting system, comprising a plurality of speed controlling motors, a master speed controlling circuit, a secondary speed controlling circuit, means in said secondary circuit to selectively control the operation of one or more of said motors, means in said master circuit for exerting simultaneous control of all of said motors, and means controlled by said master circuit for preventing independent control of any of said motors by said secondary circuit during simultaneous operation of said motors under the control of said master circuit.

WILLIAM F. FELL.